INVENTOR.
WILLARD W. RICE JR
BY Laurence H. Poelon
AGENT

INVENTOR.
WILLARD W. RICE JR
BY Lawrence H. Poeton
AGENT

Jan. 23, 1973 W. W. RICE, JR 3,712,977

ANALOG ELECTRONIC MULTIPLIER, DIVIDER AND SQUARE ROOTER USING PULSE HEIGHT AND PULSE-WIDTH MODULATION

Filed Feb. 3, 1971 4 Sheets-Sheet 3

INVENTOR.

WILLARD W. RICE JR

BY Lawrence N. Ginsberg

AGENT

| VOLTAGE IN | CALCULATED VOLTAGE OUT | MEASURED VOLTAGE OUT at 80° F | ERROR % | MEASURED VOLTAGE OUT at 135°F | ERROR % CHANGE from 80°F |
|---|---|---|---|---|---|
| 10.000 | 10.000 | 10.000 | 0 | 9.997 | -.03 |
| 9.000 | 9.487 | 9.487 | 0 | 9.484 | -.03 |
| 8.000 | 8.943 | 8.945 | +.02 | 8.942 | -.03 |
| 7.000 | 8.367 | 8.367 | 0 | 8.364 | -.03 |
| 6.000 | 7.748 | 7.746 | -.02 | 7.743 | -.03 |
| 5.000 | 7.071 | 7.070 | -.01 | 7.068 | -.02 |
| 4.000 | 6.325 | 6.323 | -.02 | 6.321 | -.02 |
| 3.000 | 5.477 | 5.474 | -.03 | 5.472 | -.02 |
| 2.000 | 4.472 | 4.468 | -.06 | 4.467 | -.01 |
| 1.000 | 3.162 | 3.156 | -.06 | 3.157 | +.01 |
| .900 | 3.000 | 2.994 | -.06 | 2.995 | +.01 |
| .800 | 2.828 | 2.823 | -.05 | 2.824 | +.01 |
| .700 | 2.646 | 2.640 | -.06 | 2.641 | +.01 |
| .600 | 2.449 | 2.444 | -.05 | 2.245 | +.01 |
| .500 | 2.236 | 2.230 | -.06 | 2.233 | +.03 |
| .400 | 2.000 | 1.994 | -.06 | 1.998 | +.04 |
| .300 | 1.732 | 1.727 | -.05 | 1.732 | +.05 |
| .200 | 1.414 | 1.411 | -.03 | 1.417 | +.06 |
| .100 | 1.000 | 1.000 | 0 | 1.012 | +.12 |

FIG. 5

INVENTOR.
WILLARD W. RICE JR.
BY Lawrence H. Poeton
AGENT

United States Patent Office 3,712,977
Patented Jan. 23, 1973

3,712,977

ANALOG ELECTRONIC MULTIPLIER, DIVIDER AND SQUARE ROOTER USING PULSE-HEIGHT AND PULSE-WIDTH MODULATION

Willard W. Rice, Jr., Foxboro, Mass., assignor to The Foxboro Company, Foxboro, Mass.

Filed Feb. 3, 1971, Ser. No. 112,154
Int. Cl. G06g 7/16, 7/20
U.S. Cl. 235—195 9 Claims

ABSTRACT OF THE DISCLOSURE

A solid-state analog electronic computing device employing pulse-height, pulse-width modulation having a filtered differential amplifier whose inputs are two trains of modulated pulses; the average value of the first being proportional to the product of first and second input signals and the average value of the second being proportional to the product of a third input signal and the output of the differential amplifier, consequent upon which the output signal is equal to the product of the first and second input signals divided by the third.

BACKGROUND OF THE INVENTION

This invention relates to computing devices. It further relates to analog electronic computing devices of the type adapted to receive electronic signals representing numerical quantities and produce a corresponding output signal having the desired relation to the input signals. In particular, this invention relates to those electronic circuits capable of the multiplying, dividing, squaring or square-rooting of electronic signals.

There are many well-known analog electronic circuits for operating on input signals to multiply, divide, square and extract the square root. A common characteristic of these circuits is their utilization of the nonlinearities of diodes, transistors, and the like to achieve these functions. Designs based on nonlinearities require careful control of these characteristics. This requirement causes two important problems in known circuits: the tedious and expensive task of selecting and matching the particular non-linearities of these components, and the great sensitivity of the circuits to changes in operating temperature.

One particularly successful device of this type, a multiplier, is disclosed in U.S. Patent No. 3,019,983 issued to George Philbrick on Feb. 6, 1962. There are many other known analog electronic computing devices capable of high accuracy or temperature stability of flexibility or inexpensive implementation. Multipliers using pulse-height, pulse-width modulation are known just as differential amplifiers are known. The art also includes comparators and feedback devices used for division. The known circuits, however, lack the capability of providing all these features in an inexpensive and temperature stable device.

SUMMARY OF THE INVENTION

It is an object of the invention disclosed to provide an improved device for computation which can function continuously, at high speed and with great accuracy for use, for example, in control equipment and analog computers. It is another object to provide relatively simple and inexpensive apparatus with these capabilities. It is still another object of this invention to provide a computing device utilizing the linear characteristics of components to avoid the necessity of selecting or matching critical components. It is still a further object of this invention to provide such a device that is relatively insensitive to changes in operating temperature.

In accordance with this invention, the computing functions are achieved by combining a differential integrator including a high gain differential amplifier, a negative feedback loop for the amplifier containing multiplier means responsive to a numerical input signal, second multiplier means responsive to two other numerical input signals and associated with the non-inventing input of the amplifier, and filtering means for the input and output of the amplifier.

BRIEF DESCRIPTION OF THE DRAWINGS

Other objects and advantages of the invention will become apparent upon reading of the following description and upon reference to the drawings, in which:

FIG. 2 including

FIG. 5 is a table of test results taken under different ambient operating temperatures.

While the invention will be described in connection with a preferred embodiment, it will be understood that it is not intended to limit the invention to that embodiment. On the contrary, it is intended to cover all alternatives, modifications and equivalents as may be included within the spirit and the scope of the invention as defined by the appended claims.

DETAILED DESCRIPTION OF THE INVENTION

Figure 1:
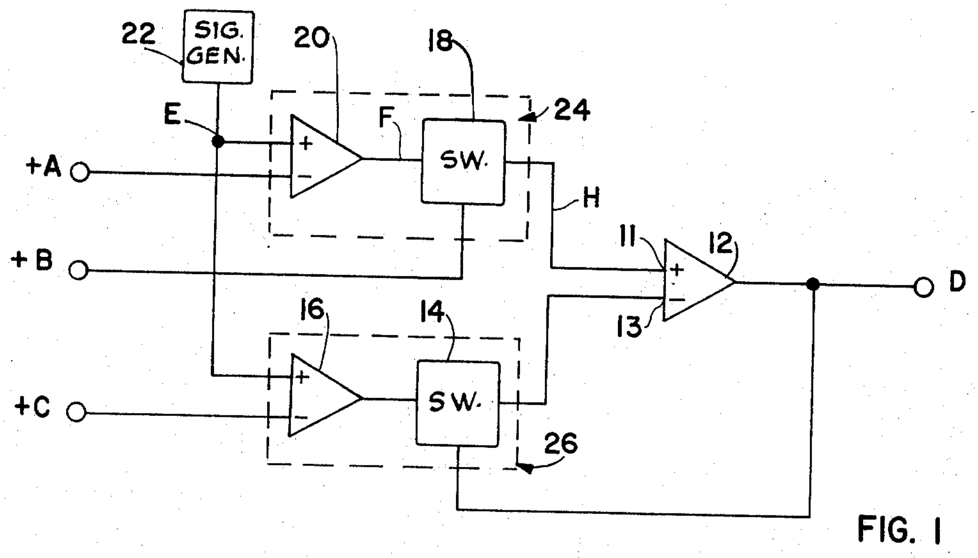
FIG. 1 is a representation in block diagram form of the basic computing device.

The device shown in FIG. 1 is a so-called multiplier-divider. This device is arranged to receive three D-C input signals A, B, and C (at the left-hand edge of the drawing) and to produce an output signal D (right-hand edge) defined as:

$$D=\frac{AB}{C}$$

The apparatus for effecting this mathematical manipulation basically comprises two identical analog multipliers 24 and 26 driving a differential amplifier 12 which produces the output D. As will be explained in detail hereinafter, the two inputs to the differential amplifier 12 are in the form of respective sets of periodic pulses of controllable duration and height. The amplifier output is smoothed by suitable low-pass filtering circuitry such that the output D is a D-C voltage corresponding to the difference between the "areas" of the two sets of applied pulses.

The analog multipliers 24 and 26 are of the pulse-height, pulse-width modulation type. In that type of multiplier, one of the two analog inputs is converted to a corresponding set of periodic pulse signals where each pulse has a duration (width) proportional to the analog value. This pulse-width signal is used to control a switch connected in series with the other analog input so as to produce at the switch output a set of periodic pulses each having a width equal to that of the switching pulse, i.e., proportional to the first analog input, and a height (amplitude) equal to the magnitude of the other analog input. Since the pulse frequency is constant, the average value of this output will be proportional to the product of the two analog inputs.

Figure 2A:
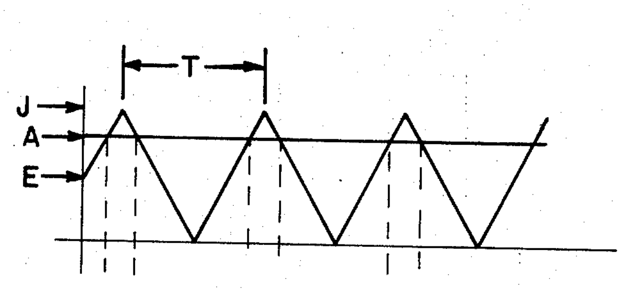
FIGS. 2*a*, 2*b*, and 2*c* is a presentation of the important waveform referenced in FIG. 1.
Figure 2B:
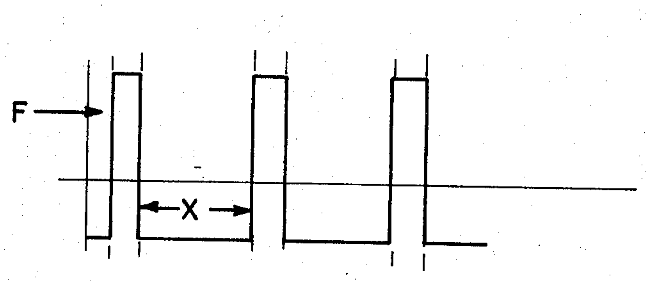

In more detail, and referring to the upper multiplier 24, the first analog input A is fed to a comparator 20 together with a triangular-wave signal E (see also FIG. 2) developed by a conventional signal-generator 22. This comparator is basically a high-gain saturating amplifier having only two output levels, negative or positive, depending upon whether the difference between the two inputs A and E is negative or positive. Whenever the triangular wave E rises above the input A as shown in FIG. 2*a*, the output of comparator 20 goes from negative to positive, thereby producing a periodic series of negative pulses the widths of which (shown as X in FIG. 2*b*) are proportional to the magnitude of the input A.

Figure 2C:
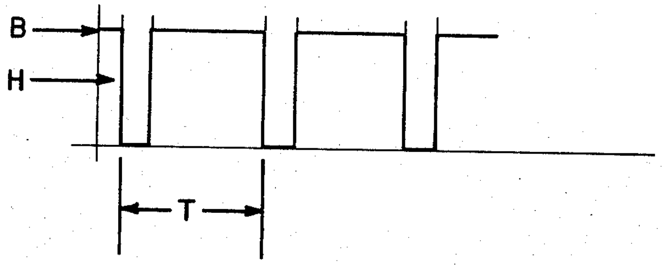

These periodic pulses operate an electronic switch 18 in such a way as to close the switch for the duration of each negative pulse. While the switch is closed, a path is completed from the second analog input B to the upper input terminal 11 of the differential amplifier 12. Thus this upper input terminal receives a series of periodic positive pulses the widths of which are proportional to the first analog input A, and the heights of which are proportional to the second analog input B as shown in FIG. 2*c*. The "area" of each pulse therefore is proportional to the product of A and B. With a constant pulse repetition frequency, the average value of the multiplier output signal is proportional to the product of the two analog inputs, AB.

In the lower multiplier 26, the third analog input C is applied with the triangular wave E to a second comparator 16, identical to the first comparator 20. The output of this second comparator is a second series of periodic pulses each having a width proportional to the value of C. These pulses operate a second electronic switch 14 to periodically connect the output voltage D developed by the differential amplifier 12 as a negative feedback signal to the lower input terminal 13 of that amplifier. Thus this lower input terminal receives a series of pulses the widths of which are proportional to the third input C, and the heights of which are proportional to the magnitude of the amplifier output D. The "area" of each pulse therefore is proportional to the product of C and D. With a constant pulse repetition frequency, the average value of the second multiplier output signal is proportional to the product of the two analog inputs, CD.

As noted hereinabove, amplifier output D is a D-C signal smoothed by suitable filtering. The magnitude of this signal is proportional to the amplifier gain multiplied by the average difference between the two amplifier input signals, i.e., the difference between the signals applied to the upper and lower input terminals 11 and 13. Expressing this relationship mathematically, $$D=g(AB-CD)$$

where $g$ is the amplifier gain.

Transposing terms:

$$D=\frac{AB}{\frac{1}{g}+C}$$

With a high-gain amplifier, $g$ is much larger than unity, and the function of the apparatus therefore can be characterized mathematically as:

$$D=\frac{AB}{C}$$

It is not necessary to scale the output D to compensate for the amplitude or period of reference signal E because both product inputs to the amplifier 12 are related to reference signal E and the effects cancel.

Thus the apparatus of FIG. 1 performs the desired composite function of simultaneous multiplication and division.

It should be noted that although certain decisions inherent in the choice of the structure of the device depicted in FIG. 1 require that input signals A, B, and C be positive, alternate arrangements are possible. In particular, if the reference waveform E is supplied inverted or the connections to the inverting and non-inverting inputs of the comparators, are reversed, signals A, B, and C may be negative or a mixture of negative and positive. This feature can be used to good advantage to minimize the circuitry required for a particular application as will be depicted hereinafter in other embodiments.

Figure 3:
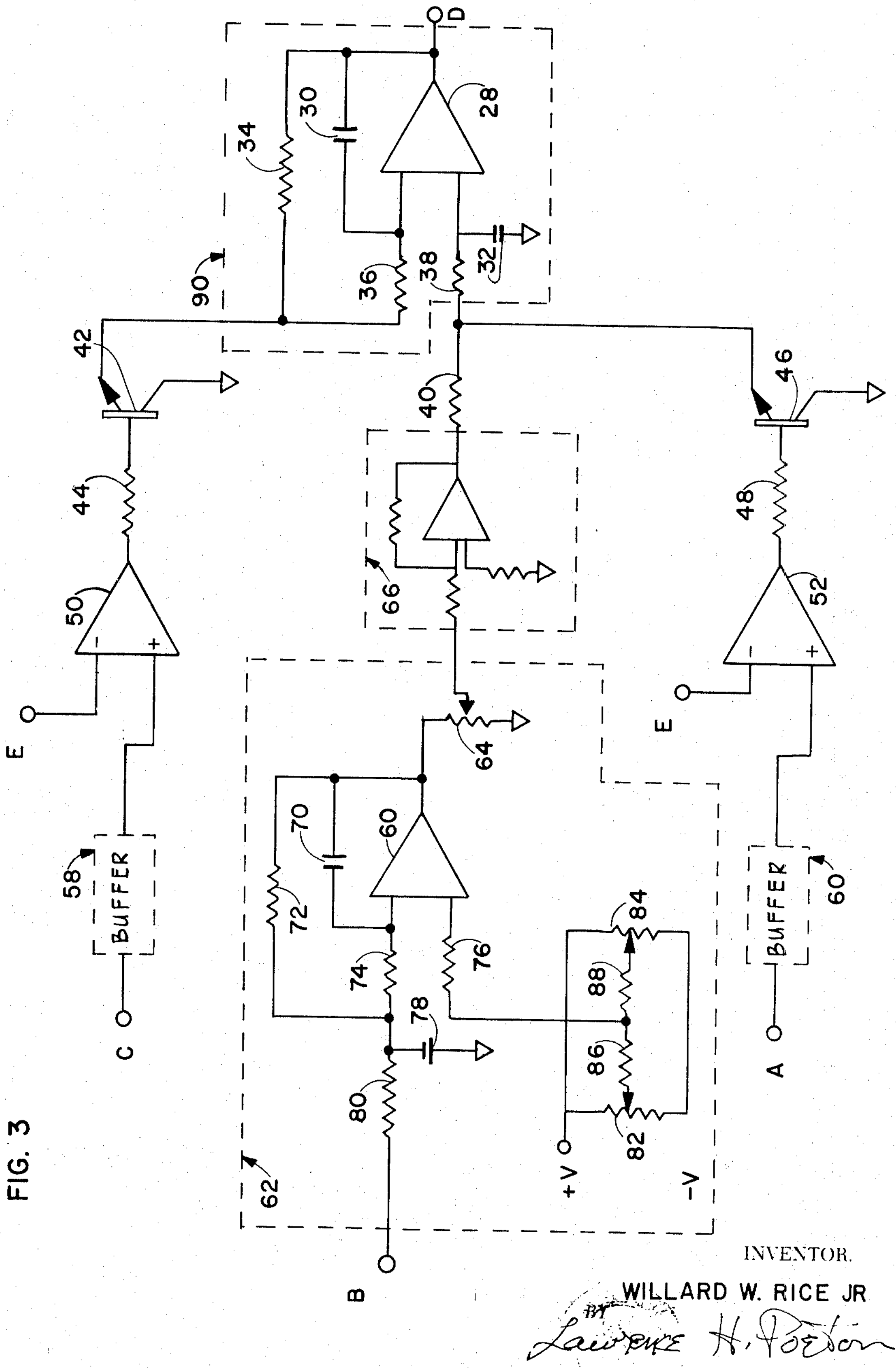
FIG. 3 is a representation in schematic form of a preferred embodiment of the invention.

FIG. 3 is a representation in schematic form of a preferred embodiment of the invention. It shows an arrangement of components capable of providing the multiplying and dividing functions and also shows components arranged to provide buffering, filtering and scaling operations on the signal inputs.

The differential amplifier is comprised by the components arranged with the block generally indicated at 90. The heart of this block is the differential amplifier 28. It is connected with negative feedback elements, resistor 34 and capacitor 30, input resistors 36 and 38, and positive input capacitor 32 in a classical differential integrator arrangement.

The first electronic switching means comprises base current limiting resistor 44 and switching transistor 42 in an inverse common emitter configuration. This configuration yields the lowest offset voltage, in the order of less than a millivolt, when the transistor is in the conducting state. The emitter of transistor 42 is tied to the junction of the input resistor 36 and feedback resistor 34 of amplifier 28. The transistor is switched by the current supplied to its base through resistor 44 by differential amplifier 50 which serves as the first comparator means. The other input of comparator 50 is connected to the reference waveform, signal E. Input buffering means 58 is connected to signal input C.

Signal input A is treated in the same manner. Elements 60, 52, 48, and 46 of the input, second comparator, and second switching means are identical to the abovementioned elements 58, 50, 44, and 42 respectively. The emitter of switch transistor 46 is tied to a summing node at the input of input resistor 38. Also connected to this node is limiting resistor 40. Because of the requirement for a change in the sign of signal B, as will be hereinafter explained, the input block 62 is modified by the addition of a signal inverting means generally indicated at 66. Input blocks 58, 60, and 62 are substantially identical and will be described by reference to the components indicated within block 62.

The heart of the input buffering, filtering and scaling means, indicated at 62, is a high gain differential amplifier 60 arranged with input resistors 80 and 76 and feedback resistor 72 to form a buffering inverter. The value of resistor 80 is selected to be slightly greater than the value of feedback resistor 72 so that the gain of the inverter is slightly greater than unity.

The output of the inverter is supplied through the wiper of span potentiometer 64. With this arrangement the potentiometer controls the transfer gain of the inverter and is adjustable from slightly over unity to zero. In this way the span, during calibration, can be adjusted to unity to compensate for the variation from ideal of the values of the components associated with the input block.

Further adjustment of the span potentiometer will produce a span scaling. That is, the gain of one input can be reduced by a convenient factor for a particular application. This ability to modify the span or input sensitivity range can be utilized to control the range of the output to within limits necessitated by other equipment or the saturation of the amplifiers.

Another type of adjustment is available through potentiometers 82 and 84 along with resistors 86 and 88. Elements 82 and 86 are arranged as a voltage divider connected between symmetrical reference voltages, +V and −V. The adjustable leg of the divider is connected to the non-inverting input of the inverter. This voltage applied serves as an adjustable bias. Another voltage divider comprising potentiometer 84 and resistor 88 is tied in parallel with the first. The values of the resistors involved are chosen in a fixed ratio, for example 10:1, so that adjustment of the potentiometers will separately have coarse and fine control of the bias voltage. This bias voltage can be used as a reference by grounding the signal input and varying potentiometer 82. The output of the input buffer will then appear as a reference voltage to the multiplier-divider.

For example, if the bias is set at unity for signal input C, then the device acts as a multiplier whose controlling equation is $$D=AB$$

Alternately, this device can be utilized as a divider by setting signal input A to unity as $$D=\frac{B}{C}$$

The inverter contained within block 62 serves as a second order filter by the addition of two RC networks, comprising resistor 74 and capacitor 70 and also resistor 80 and capacitor 78.

The following is a description of the polarities chosen for signals with the embodiment shown in FIG. 3 including the resulting alternate arrangement of signals between inverting and non-inverting of the described differential amplifiers.

The signal inputs A, B, and C are chosen to be supplied as positive signals. The input blocks 58, 60, and 62 contain a single inverting stage. Therefore, the output of those blocks are related to —A, —B, and —C. The embodiment displayed in FIG. 1 requires the provision of positive signals A and C to comparators 20 and 16 respectively. The inverted signals —A and —C can be utilized directly by merely reversing the inputs to the comparators and supplying an inverted reference waveform. That is, the reference waveform is supplied to the inverting input and the signal is supplied to the non-inverting input of the comparators. In this way the present configuration may be used without the necessity of extra stages of inversion.

This arrangement cannot be utilized directly in the circuitry associated with signal input B. Therefore, an extra stage of inversion is included as indicated at 66.

The embodiment shown in FIG. 3 may be utilized as a squaring device or square root extractor by the following operations. To obtain the square of a signal input, for example A, connect input B to input A and set the bias adjustment of block 62 equal to unity so that $$A=B$$

and $$C=1$$

Therefore, the output is the square of the input, $$D=A^2$$

Similarly to extract the square root of an input, for example A, connect the output D to the input C and set the bias adjustment of signal input B equal to unity so that $$C=D$$

and $$B=1$$

Therefore, the output will become the square root of the input $$D=\sqrt{A}$$

Figure 4:
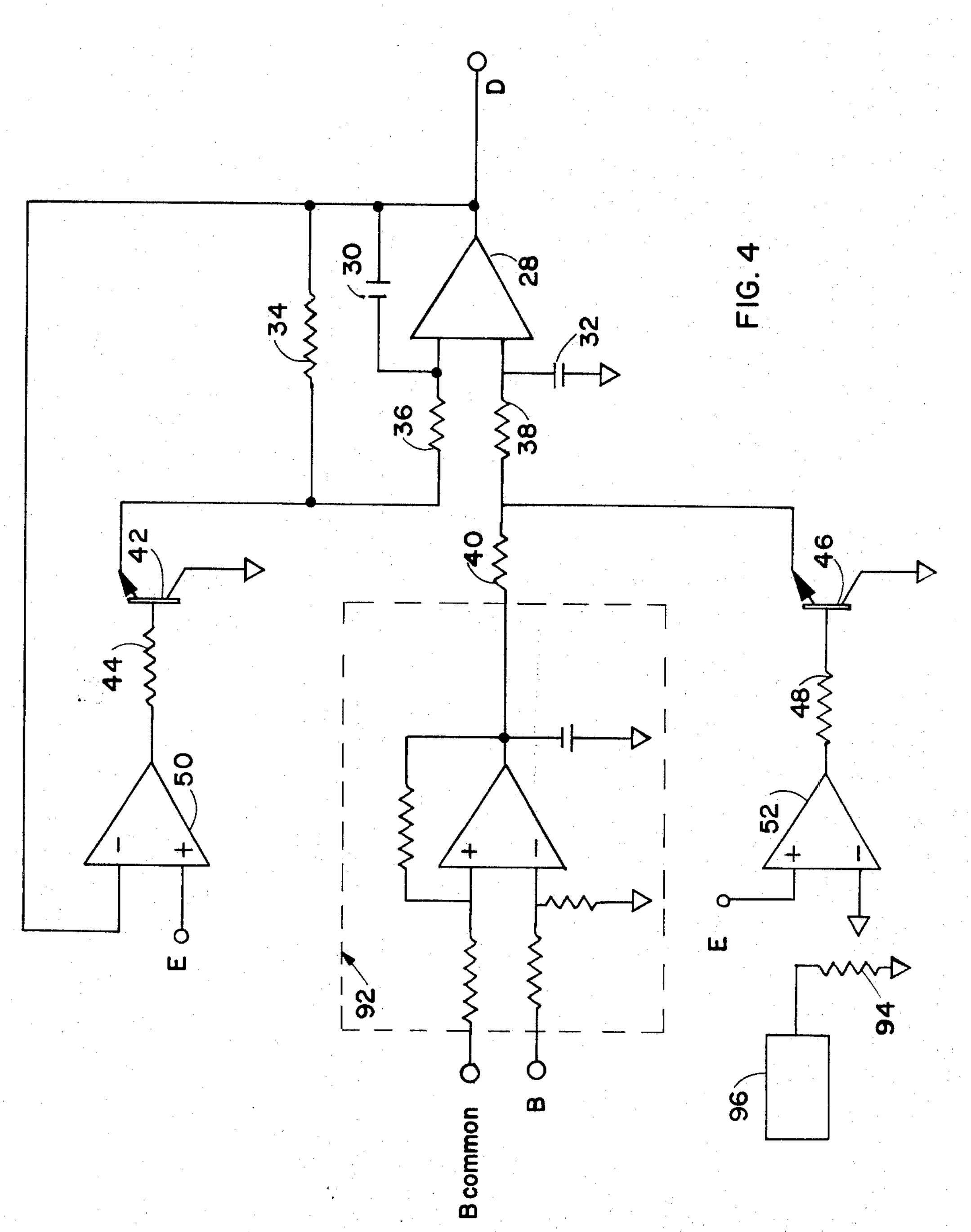
FIG. 4 is a representation in schematic form of an alternate embodiment of the invention in the form of a square root extractor.

An alternate embodiment of the invention for use particularly as a square root extractor is shown in schematic form in FIG. 4. It differs from the embodiment shown in FIG. 3 primarily in that certain component arrangements are changed to allow the omission of certain other components not specifically required by the function of the square root extractor. In essence the variation of the circuitry in FIG. 4 from FIG. 3 corresponds to the instructions described hereinabove for modifying the operation of the embodiment shown in FIG. 3 to permit the extraction of the square root of a signal input.

The changes include the omission of inverter 66 and buffer 62. This circuitry is replaced by a different amplifier generally indicated at 92. Signal input B is connected to the non-inverting input of the amplifier and the ground reference for B is connected to the inverting input and designated B common.

Input buffers 58 and 60 are omitted. The reference waveform E is connected to the non-inverting inputs of comparators 50 and 52. The non-inverting input of comparator 52 is tied to the wiper arm of potentiometer 94 which serves as an adjustable bias. Potentiometer 94 is also connected to a voltage source 96. The output signal D is directly fed back to the inverting input of comparator 50. The remaining circuitry is substantially identical to the circuitry depicted in FIG. 3. With the arrangement of components described in FIG. 4, it can easily be shown from the earlier discussion that the output is equal to the square root of the input, that is $$D=\sqrt{B}$$

Other alternate embodiments corresponding to the instructions hereinabove can also be used to reduce the number of components required.

FIG. 5 is a table of test data obtained from a circuit substantially identical to the embodiment depicted in FIG. 4. Two sets of measurement were made as the input voltage was varied approximately full scale. One set was made at 80° F. and the other at 135° F. to show the approximate effects of a change in temperature on the accuracy of the invention. The percentage of error at 80° F. from the ideal value and the change in percentage error at 135° F. were calculated and are shown in FIG. 5. The numbers given are shown for illustrative purposes only.

I claim:

1. An electronic multiplier-divider comprising, in combination:
- means for differentially integrating two signals,
- means for connecting a first signal to a first input of said integrator,
- a first multiplier having a first input connected to the output of said integrator and an output connected to a second input of said integrator,
- means for connecting a second signal to a second input of said multiplier.

2. A multiplier-divider as claimed in claim 1 further comprising:
- a second multiplier for generating said first signal having an output connected to said first input of said integrator,
- means for connecting third and fourth signals to the inputs of said second multiplier.

3. A multiplier-divider as claimed in claim 1 wherein said first multiplier includes means for producing a constant frequency train of pulses whose average value corresponds to the product of said integrator output signal and said second signal.

4. A multiplier-divider as claimed in claim 3 wherein the amplitude of said train of pulses is related to said output of said integrator and the duration of said pulses is related to said second signal.

5. A multiplier-divider as claimed in claim 2 wherein said second multiplier includes means for producing a second train of constant frequency pulses whose average value corresponds to the product of said third and fourth signals.

6. A multiplier-divider as claimed in claim 5 wherein the amplitude of said second train of pulses is related to the third signal and the duration of the pulses is related to the fourth signal.

7. A multiplier-divider as claimed in claim 2 wherein said first and second multipliers comprise
- a modulated switch for producing a discontinuous signal whose amplitude is related to one of said signals to be multiplied,
- a comparator arranged to receive as one input the other of said signals to be multiplied and to receive as another input a constant frequency reference waveform, generating means for producing said constant frequency reference waveform, whereby the discontinuous signal produced by said modulated switch is a train of constant frequency pulses whose amplitude is related to one of said signals to be multiplied and whose duration is related to the other of said signals to be multiplied.

8. In electronic computing devices, apparatus comprising in combination:

means for producing a train of constant frequency pulses whose average value is related to the product of first and second signals, means for producing a second train of constant frequency pulses whose average value is related to the product of first and second signals, means for producing a second train of constant frequency pulses whose average value is related to the product of third and fourth signals, differential integrating means having said two trains of pulses as inputs, and feedback means for coupling the output of said integrating means to said first train of pulses as said first signal, whereby said output signal corresponds to the product of said third and fourth signals divided by said second signal.

9. A computing device as claimed in claim 8 wherein said pulse train means comprises in combination, means for controlling the amplitude of said train of pulses to be related to one of said signals to be multiplied, means to control the duration of said pulses corresponding to the other of said signals to be multiplied.

References Cited

UNITED STATES PATENTS

| | | | |
|---|---|---|---|
| 3,473,043 | 10/1969 | James | 235—194 X |
| 3,466,460 | 9/1969 | Connolly | 235—194 X |
| 3,399,312 | 8/1968 | Gray | 235—194 X |
| 2,993,645 | 7/1961 | Spaven | 235—194 |
| 3,328,569 | 6/1967 | Brewster | 235—193 |
| 3,413,455 | 11/1968 | Wieder et al. | 235—194 X |
| 3,453,423 | 7/1969 | Pu-Yuan Ma | 235—195 X |
| 3,517,179 | 6/1970 | Herndon | 235—193.5 X |
| 3,555,436 | 1/1971 | Elliot | 235—193.5 VX |
| 3,593,164 | 7/1971 | Newbola | 307—229 X |

JOSEPH F. RUGGIERO, Primary Examiner

U.S. Cl. X.R.

235—193.5, 194; 307—229